Nov. 19, 1957   J. B. JACOBS   2,813,269
IMPLEMENT FOR APPLYING AN UMBILICAL CORD
SEAL AND IDENTIFYING NEWLY BORN BABIES
Filed Jan. 25, 1956   4 Sheets-Sheet 1

INVENTOR.
JOHN BAY JACOBS
BY
Patrick D. Beavers
ATTORNEY

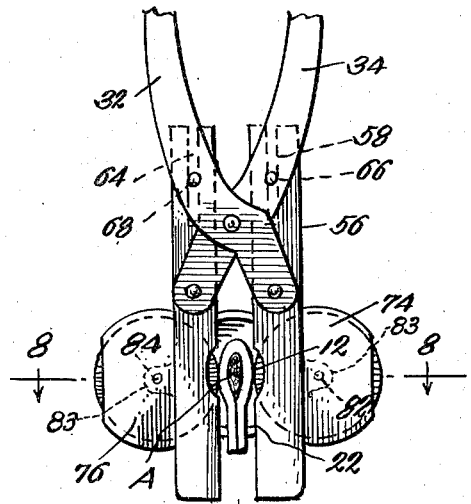
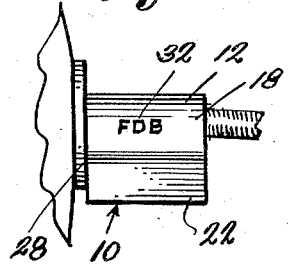
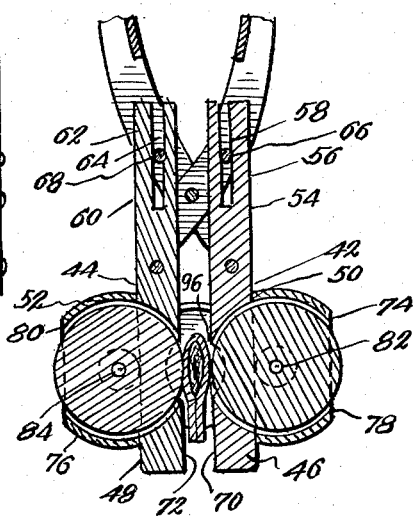
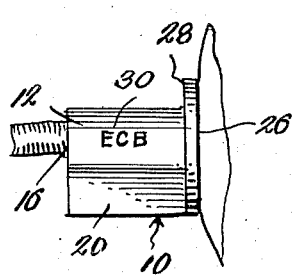
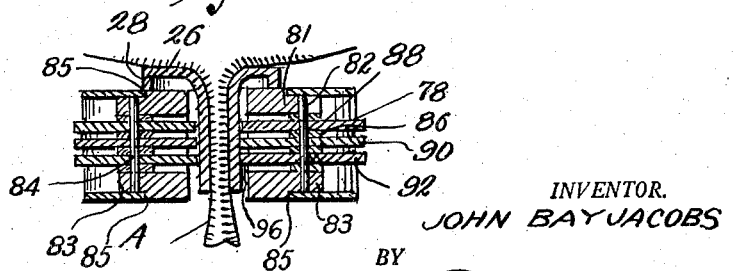
INVENTOR.
JOHN BAY JACOBS
BY
Patrick D Beavers
ATTORNEY

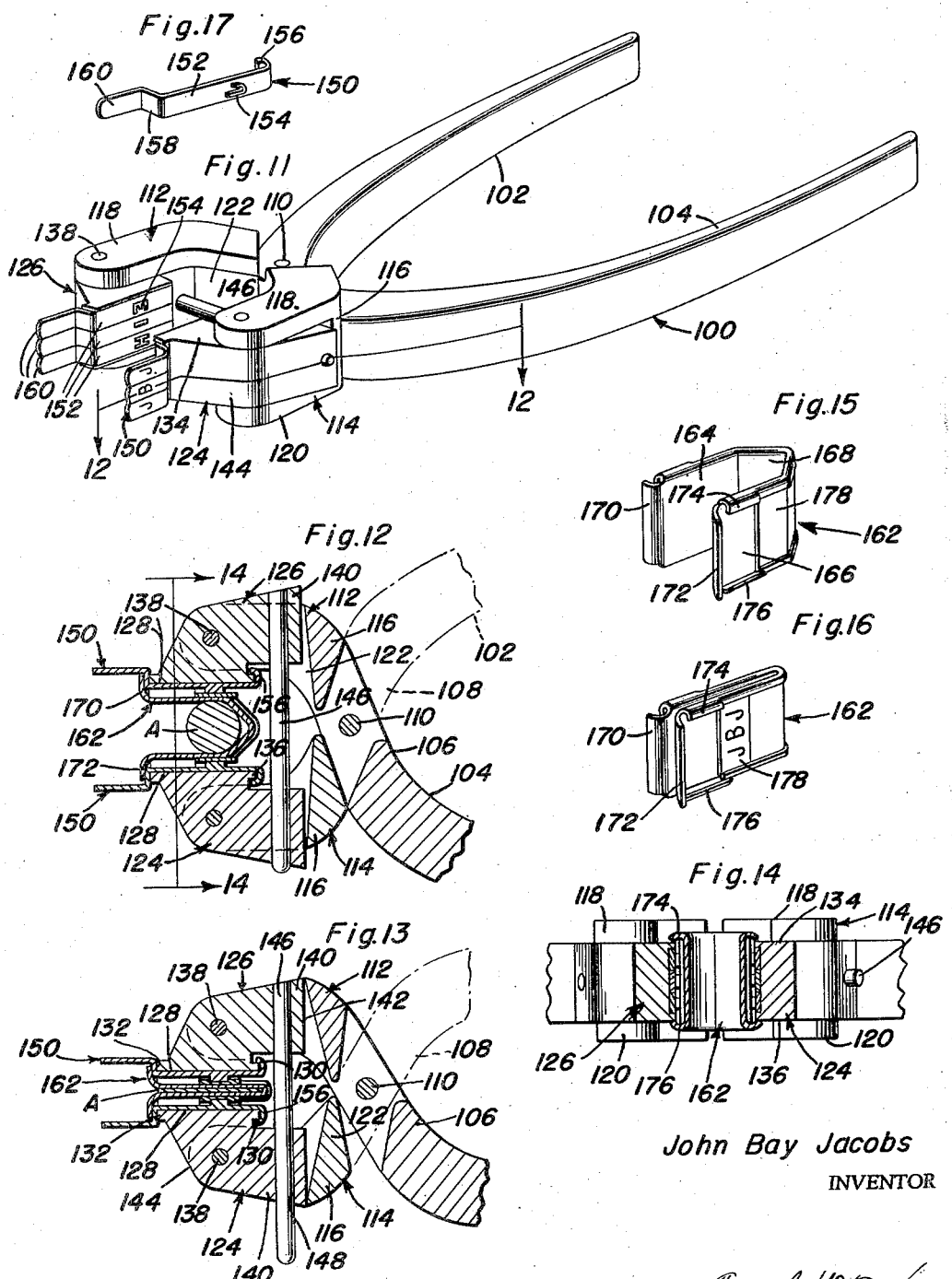

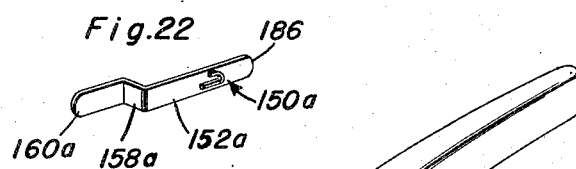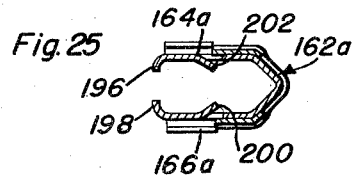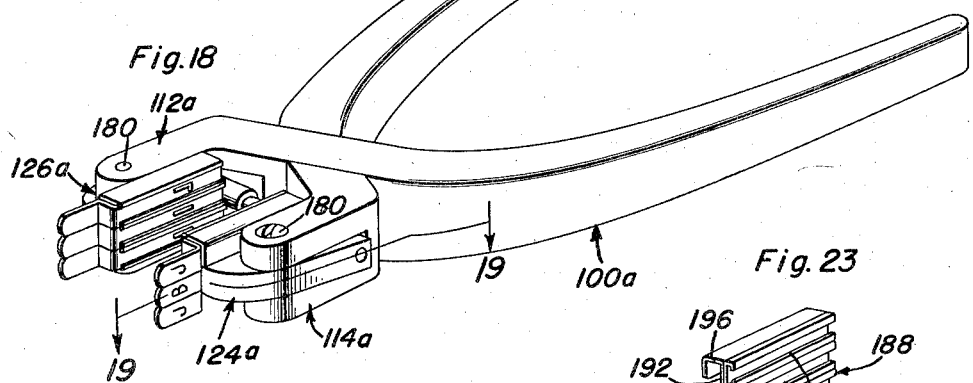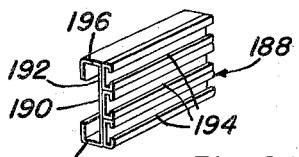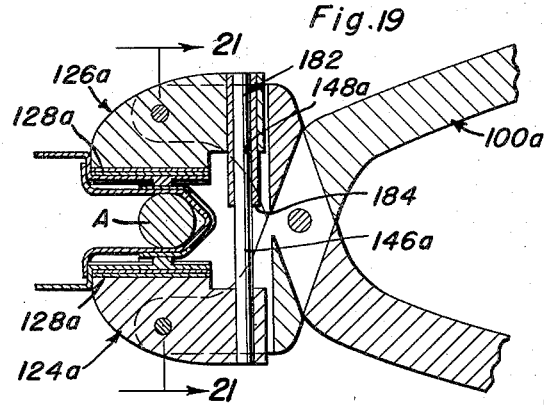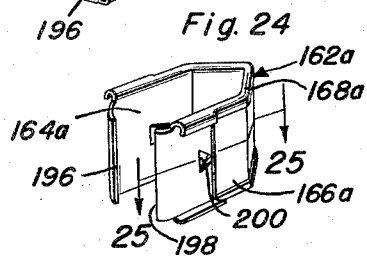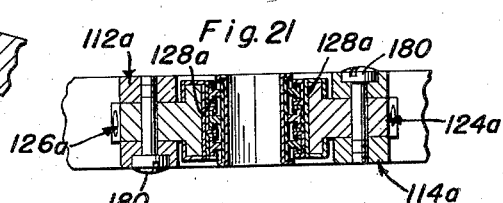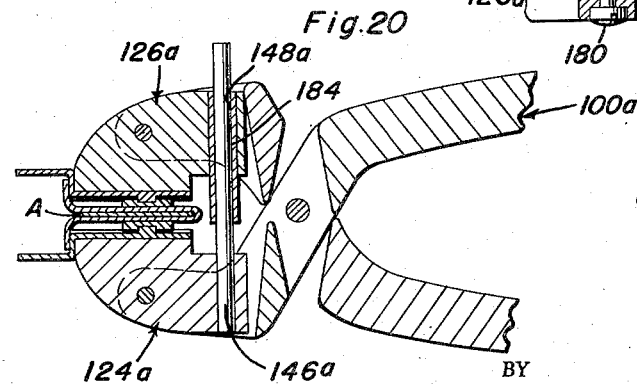
John Bay Jacobs
INVENTOR United States Patent Office 2,813,269
Patented Nov. 19, 1957

2,813,269

IMPLEMENT FOR APPLYING AN UMBILICAL CORD SEAL AND IDENTIFYING NEWLY BORN BABIES

John Bay Jacobs, Arlington, Va.

Application January 25, 1956, Serial No. 561,292

1 Claim. (Cl. 1—200)

The present invention relates to improvements in the art of obstetrics and especially relates to an umbilical cord seal and means for identifying newly born infants. This application is a continuation-in-part of my pending application, Serial No. 319,369, filed November 7, 1952, now abandoned.

The primary object of this invention is to provide an identification element which is adapted to be clamped onto an umbilical cord, before the cord is severed, and which serves the dual purpose of a hemostat and an identification means and to provide a tool for clamping the element on the cord and marking it with identification symbols.

In present obstetric practice, the umbilical cord is severed at a point in proximity to the abdomen of the newly born infant after hemostats are applied to the cord on opposite points of the line of severance. The stump outward of the abdomen may then be dressed with gauze and eventually falls off.

Part of this practice is obviated by this invention, which also avoids the delays and fallibilities of present identification methods. In the latter respect some of the present methods are either (1) to take the foot prints of the infant, and thumb prints of the mother, or (2) to place an identification bracelet of beads spelling out the surname of the infant, around the wrist of the infant. All of these modes of placing identification markers on the infant or of recording a print of a part of the infant's anatomy are carried out sometime after delivery, before or after the infant has been prepared for the nursery. In other words, all of the present practices are performed after a lapse of time and are, therefore, subject to human mistake so that they cannot be absolutely relied upon, though they are generally accurate.

But to obviate any possibility of mistake, this invention comprehends the placing of an identification clamp upon the umbilical cord, while it is still attached to the placenta and before it is severed. Therefore, there can be no possible mistake in identifying the offspring of a mother.

The identification clamp is positioned in proximity to the abdomen of the infant and serves also as a hemostat. The identification clamp is preferably stamped, impressed or marked with identifying characters or markings by a tool that also clamps it on the cord to check the flow of blood.

Another object of this invention is to provide an identification clamp or marker which can be easily passed laterally over the umbilical cord and which has opposing sides that can be clampingly brought together onto the cord and bear markings on their outer surfaces.

A further object of the invention is to provide a tool for clamping the sides of the marker together and for inscribing, at the same time, identifying indicia on the outer surfaces thereof.

A further important object of this invention is to provide a cooperating clamp and tool, the clamp and tool having interengaging means so that the tool can hold the clamp and be used to place the clamp on the cord and thereafter be used to compress the clamp onto the cord while, at the same time, marking the clamp with identifying indicia. Thus, with one hand, the obstetrician can clamp off the cord and form identifying indicia on the cord.

Another object of this invention is to provide a tool that has a pair of complemental jaws which are movable relative to each other substantially in rectilinear aligned paths and which carry easily changeable and settable identifying characters to be pressed into the sides of the identification clamp or marker which is preferably formed from any suitable ductile material.

These and ancillary objects are attained by this invention, the preferred embodiments of which are set forth in the following description and illustrated in the accompanying drawings, wherein:

Figure 5 is a fragmentary plan view of the tool of Figure 4 showing it in use to compress the identification clamp;

Figure 6 is a side elevational view of the jaw of the tool of Figure 4;

Figure 7 is a vertical sectional view taken on line 7—7 of Figure 6;

Figure 8 is a transverse sectional view taken on line 8—8 of Figure 5;

Figure 9 is an elevational view of one side of the identification clamp of Figure 1;

Figure 10 is a view of the other side of the clamp;

Figure 11 is a perspective view of another form of tool;

Figure 12 is a detailed longitudinal sectional view taken on line 12—12 of Figure 11 and showing the jaws of the tool in an open position;

Figure 13 is a view, similar to that of Figure 12, and showing the jaws in a closed position;

Figure 14 is a cross-sectional view taken on line 14—14 of Figure 12;

Figure 15 is a perspective view of another form of identification clamp and showing the same in an open position;

Figure 16 is a perspective view of the clamp of Figure 15, showing the same in a closed position;

Figure 17 is a perspective view of one of removable indicia plates or type bars which are carried by the jaws of the tool, as shown in Figure 11;

Figure 18 is a perspective view of another form of tool;

Figure 19 is a detailed longitudinal sectional view taken on line 19—19 of Figure 18 and showing the jaws of the tool of Figure 18 in an open position;

Figure 20 is a view, similar to that of Figure 19, and showing the jaws closed;

Figure 21 is a transverse sectional view taken on line 21—21 of Figure 19;

Figure 22 is a perspective view of one of the removable indicia plates or type bars which are carried by the jaws of the tool, as shown in Figure 18;

Figure 23 is a perspective view of the carrier for the type bars of Figures 18 and 22;

Figure 24 is a perspective showing of a modified form of identification clamp, and, Figure 25 is a longitudinal sectional view taken on line 25—25 of Figure 24.

Figure 1:
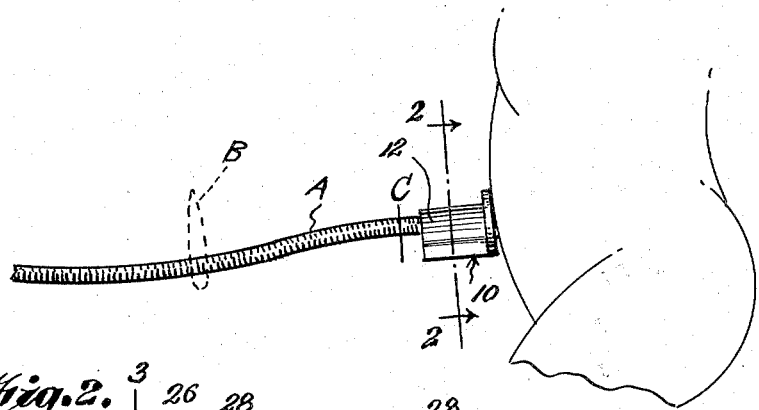
Figure 1 is a side elevational view of one form of identification clamp showing the same positioned on the umbilical cord prior to being clamped in place.
Figures 2, 3:
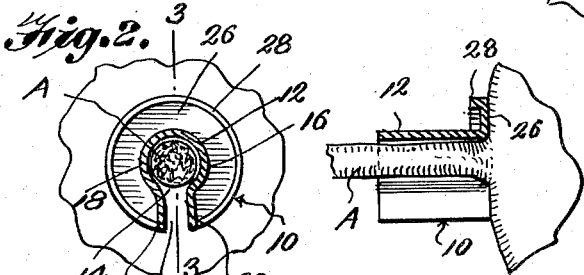
Figure 2 is a transverse sectional view taken on line 2—2 of Figure 1.
Figure 3 is a longitudinal vertical sectional view taken on line 3—3 of Figure 2.

With more particular reference to the accompanying drawings, attention is first directed to Figures 1–3 and 9 and 10 for a detailed description of one form of identification clamp 10. The identification clamp is preferably formed from any suitable ductile material and includes an open cylindrical or tubular body section 12 that has a radial opening 14 extending axially through the ends. The opening 14 is formed at the bottom of the body section and the opposite sides 16 and 18 have flat parallel flanges 20 and 22 formed on their free edges. The flanges are coextensive in width and length and extend from one end of the body section to the other.

It will be particularly noted that the flanges 20 and 22 define a passage 24 which communicates with the interior of the body section 12 through the opening 14 and that the passage 24 is of a width approximating the external diameter of the umbilical cord. The diameters of umbilical cords do not vary considerably but this is not critical since the body section is of ductile material and will be clamped onto the cord. Therefore, the body section will be made to fit the larger umbilical cords and the clearance in using it on smaller diameter cords will be taken up in attaching it to the cord in the manner to be described; also, the flanges 20 and 22 can be spread if necessary.

A continuous flange 26 radiates from one end of the body section and adjoining ends of the flanges 20 and 22 and has an opening registered with the passage 24. The flange 26 cooperates with the tool, as will be described. A peripheral rib 28 extends laterally from the flange 26 to abut the tool. The flange and its associated rib enables the obstetrician to apply the clamp with one hand. The guard flange 26 and rib 28 also protect the infant.

The outer surfaces of the sides 16 and 18 are preferably smooth and, as seen in Figures 9 and 10, the flanges 20 and 22 have their inner ends adjoining the flange integral with the ends of the projection 28. The flanges 16 and 18 are adapted to have identifying indicia, i. e. inscribed, marked or impressed on their outer surfaces.

Preferably, such indicia are the initials of the father, as at 30, and the initials of the obstetrician, as at 32, one set being on one side and the other set on the opposite side. Such indicia or identifying marks may be of any desired type and may even include, by way of code, pertinent facts concerning the physical characteristics or malformations of the infant.

It is preferred that the indicia be impressed into the sides of the clamp and, therefore, on the umbilical cord during the act of squeezing the sides together. In this manner, two results will stem from the same squeezing or clamping action, under the force of a tool namely, the identifying indicia will be permanently placed on the body section 12 and the body section will function as a hemostat to check the flow of blood from the blood vessels in the cord.

In Figures 4 and 6–9, one form of a tool used in obtaining the above results is illustrated and it comprises a pair of handles 32 and 34, which terminate in inner forks 36 and 38. The branches of the ends 36 and 38 are offset from the handles and the ends of the handle 32 overlie the ends of the handle 34 and are pivoted thereto by a pivot pin 40 that extends transversely thereof.

Figure 4:
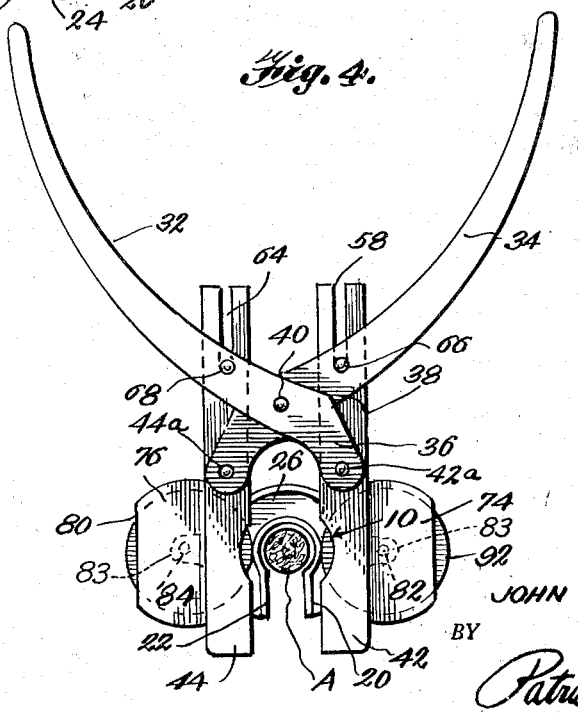
Figure 4 is a front elevational view of one form of tool, showing the same in position for use, with the identification clamp shown in front elevation and the umbilical cord in section.

Jaws 42 and 44 are carried by the ends 36 and 38, as seen in Figure 4 with the jaws secured by pivot pins 42a and 44a between the branches of the ends. The jaws include outer solid ends 46 and 48 of rectangular cross section, which are formed with transverse openings 50 and 52.

The inner end 54 of the jaw 42 is bifurcated, the bifurcation 56 is defined by an axial slot 58 extending through the outer extremity of the end 54. Similarly, the inner end 60 of the jaw 44 is bifurcated, the bifurcations 62 being defined by the axial slot 64. The bifurcations 56 slidably hold a pin 66 disposed transversely therebetween in the slot 58, the pin being secured at its ends to the branches of the end 38 of the handle 34 in line with the pivot pin 42a. A pin 68 is transversely disposed between the branches of the end 36 of the handle 32 and is slidably disposed within the slot 64.

The inner face 70 of the jaw 42 is flat, as is the complemental face 72 of the jaw 44. The openings 50 and 52 are concaved from the outer faces to the inner faces of the jaws 42 and 44, so that the openings at the outer faces are larger than they are at the inner faces 70 and 72. The openings 50 and 52, at the inner faces, extend through the side walls of the jaws while also extending through the outer faces of the jaws.

Semi-circular casings 74 and 76 are mounted on the jaws at the outer faces thereof and enclose the openings 50 and 52, the outer sections of the casings having transverse openings 78 and 80, which are aligned with the openings 50 and 52. The jaws are formed at their outer sides midway of the openings 50 and 52 with integral, laterally outwardly projecting apertured ears 81 and 83 over which the sides of the casings fit. The jaws are offset inwardly from the outer sides to provide shoulders 85 against which the side edges of the casings abut to be disposed flush with the outer sides of the jaws, as shown in Figure 8. The ears carry transverse pins 82 and 84 to the ends of which the sides of the casings are secured. Mounted on each pin and spaced apart by fixed spacers 86 are rotatable discs 88, 90 and 92. The number of discs is three, for exemplary purposes only, since one or any number can be employed, dependent upon the nature and type of indicia or characters to be inscribed on the sides 16 and 18 of the body section 12.

By way of example, the three discs 88, 90 and 92 are shown, each of which is identically constructed and as shown in Figures 7 and 5, the discs have opposing peripheral portions. The portion 94 is disposed opposite the openings 78 or 80 and is adapted to be engaged by the finger of the obstetrician. The peripheral portions extend through the openings 50 or 52 for selective engagement with the sides of the body section 12 of the identification element or marker 10. One the peripheral portions, raised letters 96 are formed, which correspond to the diametrically placed letters on the portion 94. Thus, the discs are set by positioning the desired letter on the periphery of each disc in alignment with the line 100 on the casings, as shown in Figure 6. The corresponding raised letter will then be disposed at the inner face of the jaw carrying the discs.

In use, the identification element or marker 10 is placed on the umbilical cord A so that the flange 26 abuts the abdomen of the infant. It is to be particularly noted that the marker 10 is passed laterally over the cord A, the cord A moving through the passage 24 and opening 14, when the cord is still connected between the placenta of the mother and the infant. Thus there is no possibility of mistake.

The discs 88, 90 and 92 on each jaw 42 and 44 are set by positioning a finger through the openings 78 and 80 and rotating the discs until the desired letters are lined up with the line 100. The jaws are then passed down over the sides 16 and 18 of the body section 12 with the jaws being limited in their spreading movement by the pins 66 and 68.

The jaws assume the position relative to the marker 10 as shown in Figure 4 and the handles 32 and 34 are squeezed together to force the disc against the sides 16 and 18 and impress the sides with the raised letters. The outer or free ends of the inner faces 70 and 72 of the jaws squeeze the flanges 20 and 22 together, as shown in Figures 5 and 7, to lock the marker 10 tightly on the cord. In its clamped position, the marker 10 also serves as a hemostat and, thus, after a hemostat B is secured to the umbilical cord, the cord is severed at C, Fig. 1.

Obviously, there may be as many discs for marking the clamp as may be desired on each side of the tool, but it may be satisfactory to have a limit of three. It is also preferable that the characters on the periphery of the disc be outstanding so that they can be easily engaged by the fingers. Another feature that might be taken into consideration is that the covers for the discs may have their windows bevelled so that fingers can be easily inserted.

While not shown in the drawings, some suitable detent means may be provided for the discs so that when they are properly set, they will remain in place. Moreover, there are two sets of characters for each disc periphery, the characters appearing through the windows 78, 80 being represented by like characters opposed to the clamp structures.

In Figures 11–14, a modified form of tool 100 is shown. The tool includes the handles 102 and 104 which have crossed interfitting end portions 106 and 108 that are connected by a pivot pin 110. The end portions terminate in offset housings 112 and 114 which are integral with the end portions. The housings are disposed substantially parallel and are each U-shaped in longitudinal cross-section. The housings include inner end walls 116 and parallel top and bottom walls 118 and 120 which are unconnected at their outer ends. As shown in Figure 12, the housings have their inner end walls formed on the end portions substantially in alignment with the pivot pin 110 and spaced slightly outwardly therefrom. Thus, as the handles 102 and 104 are brought together, the end portions 106 and 108 pivot about the pivot 110 and the housings are brought closer together. The inner faces 122 of the end walls are inclined inwardly relative to each other, as shown in Figure 12 wherein the tool is shown in its fully open position.

Mounted in each of the housings are jaws 124 and 126. Each of the jaws is identically constructed and includes an inner face 128 which terminates at its inner end in an under-cut shoulder 130 and at its outer end in a squared abutment 132. Each jaw has flat upper and lower sides 134 and 136 which confront the inner sides of the top and bottom walls 118 and 120 of the housings. The jaws are mounted in the housings between the walls 118 and 120 by pins 138 which extend therethrough and are secured to the walls 118 and 120. The jaws have reduced tail sections 140 which have their ends 142 slightly beveled to cooperate with the faces 122 of the end walls of the housings, as shown in Figures 12 and 13, and provided clearance for the relative movement of the housings and the jaws. The pins 138 are positioned adjacent the outer rounded off ends 144 of the jaws and are in alignment transversely of the jaws substantially at the center of the inner faces 128 of the jaws.

The tail section of the jaw 126 carries a guide pin 146 which projects laterally inwardly therefrom toward the tail section of the other jaw 124 and is slidably received in a transverse bore 148 in the tail section of the jaw 124. The guide pin 146 maintains the inner faces of the jaws in parallelism in any position of the jaws relative to each other. Thus, the jaws move in rectilinear path toward and away from each other. Such movement is produced by the curvilinear movement of the housings about the pins 138 while the jaws are restrained from swinging about the pins 138 by the guide means, consisting of the pin 146 and bore 148 in which the pin is telescopically arranged.

The inner faces 128 of the jaws are flat and are preferably of rectangular shape in plan. Type or indicia bars 150 are formed to be detachably secured on the faces. Each bar 150, as shown in Figure 17, includes a relatively narrow flat center section 152 on the outer face of which a raised letter 154 is formed. In this regard, a symbol or any other marking could be provided and such marking could be of a type to print, rather than impress.

The center section terminates at its inner end in a hook 156 which is provided to hook over the inner end of the face and engage the inner shoulder 130 on the faces. The center section terminates at its outer end in a flat lateral flange 158 which abuts the abutment 132. A finger piece 160 extends from the flange and is parallel with the center section.

It is understood that a plurality of such individual type bars are provided for attachment to the inner faces 128 of the jaws. It is preferred that the faces 128 and the bars be of such relative widths that three of the bars, as shown in Figure 11, can be attached, at one time to the faces. However, such showing is purely exemplary. With regard to the showing, however, if the type bars are formed with letters then there must be at least three bars with the same letter. In this respect, as aforedescribed, the three initials of both the father and the obstetrician in attendance will preferably be inscribed on an identification clamp.

It can be seen that the type bars are separately affixed on the faces by grasping the end piece of a bar and hooking the hook 156 over the inner end of the face. The center section 152 of the bars is of the same length as the length of the faces so that the flange clampingly abuts the outer ends of the faces to clamp the bars in place.

Cooperating functionally and structurally with the tool 100 in clamping off the umbilical cord and affixing identification means on the stump of the cord are identification clamps 162. As shown in Figures 15 and 16, the clamp is substantially arcuate or horseshoe shape in plan. The clamp, which is formed from any suitable ductile material, includes parallel sides 164 and 166 which are joined at their inner ends by a triangular shaped web portion 168.

The inner faces of the sides are flat and the outer ends of the sides are formed with outwardly curved stops 170 and 172. Cooperating with the stops are guide channels 174 and 176 which are formed at the edges of the sides and overlie the outer faces at the side edges. The channels 174 and 176 are provided to overlie and receive the side edges of the inner faces 128 of the jaws.

Thus, the channels and the stops constitute an attaching means for attaching the clamp to the jaws. In use, the clamp is inserted between the inner faces of the jaws with the channels engaging the side edges of the jaws. The stops locate the clamp in place and cooperate with the channels in positioning the clamp in proper position between the jaws.

With the clamp in place, as shown in Figure 12, the tool is held in one hand, the other hand being free for other operations, and the clamp is passed laterally onto the umbilical cord A, until the cord is located between the sides 164 and 166 of the clamp. The diameter of the cord A is immaterial since such cords do not vary materially in diameter and the relative variance will not have any effect on the proper clamping operation because the major portion of the cord will be clamped between the sides, regardless of the size of the cord.

After the clamp has been so positioned on the cord, the handles are brought together and the clamp is compressed into a flat form, shown in Figure 16. As shown in Figure 13, the cord is compressed between the sides of the clamp which are elongated due to the compression of the web portion 164. Simultaneous with the compression of the clamp onto the cord, the outer faces of the sides are marked by the raised letters 154, as shown in Figure 16. In this respect, it is preferred to provide reinforcement strips 178 transversely on the outer faces of the sides 164 and 166, such strips receiving the impression of the letters.

A modified form of tool 100a is shown in Figs. 18–21,

The tool 100a is similar to the tool 100 and includes housings 112a and 114a within which jaws 124a and 126a are mounted by countersunk screws 180. The housings swing about the screws as pivots while the jaws are restrained to consequent rectilinear relative movement by a guide means 182. The guide means 182 includes a pin 146a which laterally projects from the tail section of the jaw 124a and is telescopically received in a tube 184 that is mounted in a transverse bore 148a in the other jaw. The tube extends laterally inwardly from the jaw. Because of the tube, the pin 146a does not project outwardly as far, when the jaws are closed, as does the pin 146 of the tool 100.

The jaws 124a and 126a are substantially T-shaped in cross section, as illustrated in Figure 21. The heads of the jaws 124a and 126a have flat outer faces 128a which carry the type bars 150a, as will be described. The type bars 150a, as shown in Figure 22, are similar to the bars 150 except that the center section 152a is formed with a rounded inner end 186. The outer ends of the bars 150a carry the flanges 158a and finger pieces 160a. Instead of securing a number, such as three, of the bars 150a one by one in place on the faces 128a, a carrier 188, shown in Figure 23, is provided. The carrier includes a channel shaped slide element 190 which is adapted to slide onto the heads of the jaws, as shown in Figure 21. The flat web wall 192 of the slide element has three channel shaped grooves 194 formed longitudinally on its outer face and each groove is adapted to slidingly receive a type bar 150a. Thus, the bars with the desired letters or symbols are inserted into the grooves and then the carrier is positioned on the head with the rails 196 of the slide element engaging the sides and underface of the heads. The type bars are, thus, secured to the faces 128a as a unit.

In use, the tool 100a functions in the same manner as the tool 100, as illustrated in Figures 19 and 20.

Another form of identification clamp 162a is shown in Figures 24 and 25. The clamp 162a is formed from any suitable ductile material and is similar in shape to the clamp 162. It is formed with sides 164a and 166a and a connecting triangular web portion 168a.

The outer or free ends 196 and 198 of the sides are inturned or curved inwardly so as to meet when the clamp is compressed and encircle the umbilical cord. The sides are also formed with barbs or tangs 200 and 202 which are struck inwardly and are extended rearwardly away from the mouth of the clamp and toward the web portion.

The tangs 200 and 202 are provided to bite into and grip the umbilical cord and prevent it from sliding out from between the sides of the clamp, as the sides are pressed together and the clamp is compressed on the cord. The inturned ends 196 and 198 also serve to prevent the cord from sliding out from between the sides of the clamp.

While the foregoing description sets forth specific forms of the invention, it is to be understood that numerous changes in the shape, size and materials may be resorted to without departing from the spirit and scope of the invention as claimed hereinafter.

Having thus fully described my invention, what I claim is:

A device for use in obstetrics for applying an identifying element to an umbilical cord to serve as a means for identifying a new born infant, comprising a pair of pivotally connected levers having a pair of opposed jaws respectively pivoted thereto, means for constraining said jaws to substantially parallel movement toward and from each other whereby said tool may be applied with said jaws on opposite sides of the cord while the latter is serving as a communicating connection between the placenta of the mother and abdomen of the baby, interchangeable surface providing means for the opposed portions of said jaws and having raised identifying indicia for contact with and transference of markings to opposite sides of an identifying element to identify both the doctor and the mother prior to the severance of said cord and the separation of the infant from the mother, said surface providing means having edge portions disposed laterally in the same direction and spaced apart in a manner to extend over forward and rear edges of said jaws for intimately and securely fastening said surface providing means and jaws in assembled relation, said surface providing means having an externally exposed portion with identifying means thereon corresponding to said identifying indicia and in a position to be visible regardless of the relative position of said jaws, said surface providing means and said jaws including a plurality of abutment portions constraining said surface providing means against lateral movement relative to said jaws.

References Cited in the file of this patent

UNITED STATES PATENTS

| | | |
|---|---|---|
| 125,610 | Olmsted | Apr. 9, 1872 |
| 826,647 | Bruno | July 24, 1906 |
| 975,857 | Groom et al. | Nov. 15, 1910 |
| 1,378,520 | Bradley | May 17, 1921 |
| 2,194,748 | Glaser et al. | Mar. 26, 1940 |
| 2,307,377 | Ricardi | Jan. 5, 1943 |
| 2,626,608 | Garland | Jan. 27, 1953 |